United States Patent [19]
van der Lely

[11] 3,806,042
[45] Apr. 23, 1974

[54] SPREADING IMPLEMENTS
[76] Inventor: Cornelis van der Lely, 7, Bruschenrain, Zug, Switzerland
[22] Filed: Apr. 13, 1972
[21] Appl. No.: 243,560

[30] Foreign Application Priority Data
Apr. 15, 1971 Netherlands............ 7105004

[52] U.S. Cl................... 239/658, 239/657
[51] Int. Cl. ..... A01g 3/06, A01g 7/00, A01g 15/00
[58] Field of Search............ 239/658, 657, 669

[56] References Cited
UNITED STATES PATENTS

| | | | |
|---|---|---|---|
| 3,185,326 | 5/1965 | Vanderloop | 239/657 |
| 3,195,899 | 7/1965 | Neuenschwander | 239/657;658 |
| 3,095,202 | 6/1963 | Kucera | 239/658 |
| 3,175,829 | 3/1965 | Ferris | 239/658 |
| 3,383,053 | 5/1968 | Wood | 239/658 |
| 3,406,914 | 10/1968 | Lepp et al | 239/658 |
| 3,474,926 | 10/1969 | Skromme | 239/658 |

Primary Examiner—Lloyd L. King
Attorney, Agent, or Firm—Mason, Mason & Albright

[57] ABSTRACT

A spreader attachment for distributing muck material uniformly over the ground, has a hopper in which the bottom and at least one ejector shaft are inclined between the horizontal and vertical. The back side of the hopper is open near the top thereof so that rotation of the ejector shaft with ejectors continuously causes some of the muck material to be thrown to the rear of the hopper. The ejector can be flexible chains of various lengths that are secured along the length of the shaft. More than one ejector shaft can be rotatably mounted in the hopper and each connected to a common transmission which is in driving engagement with the power take off of a prime mover.

16 Claims, 22 Drawing Figures

SPREADING IMPLEMENTS

Figure 1:
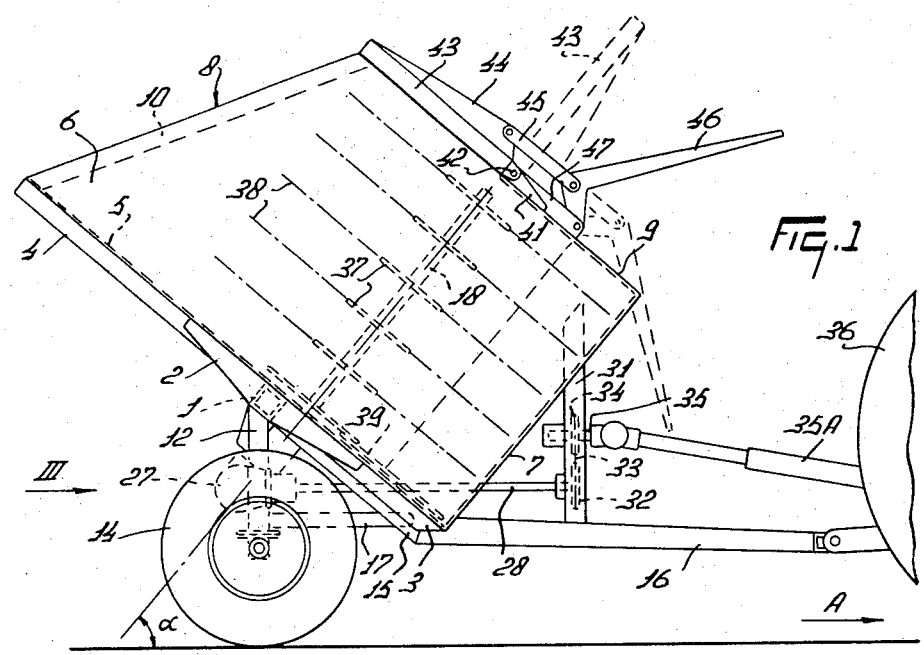
Figure 2:
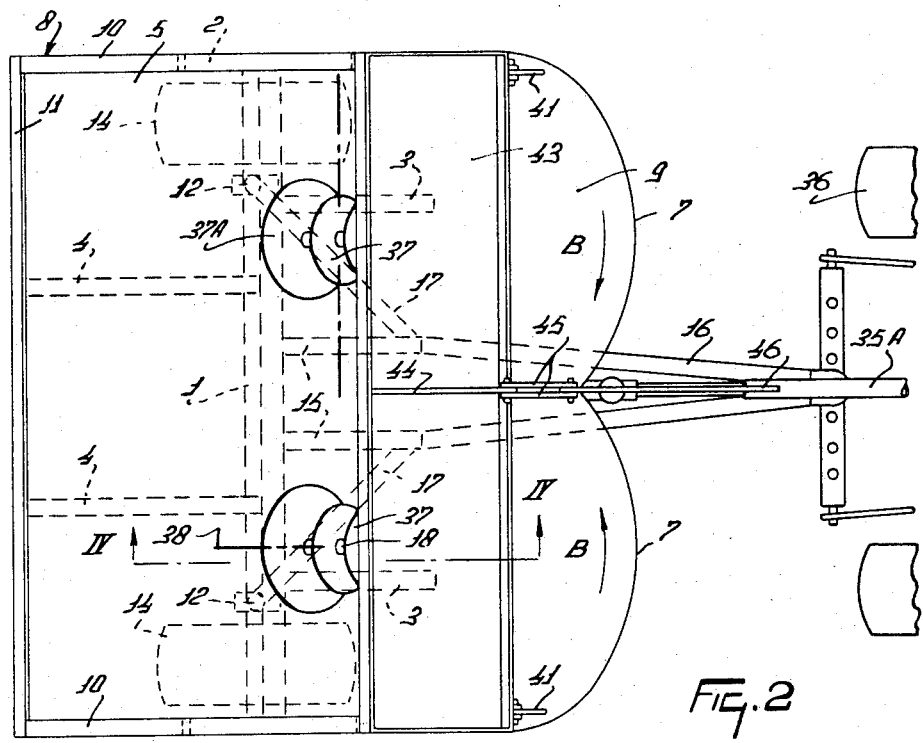
Figure 3:
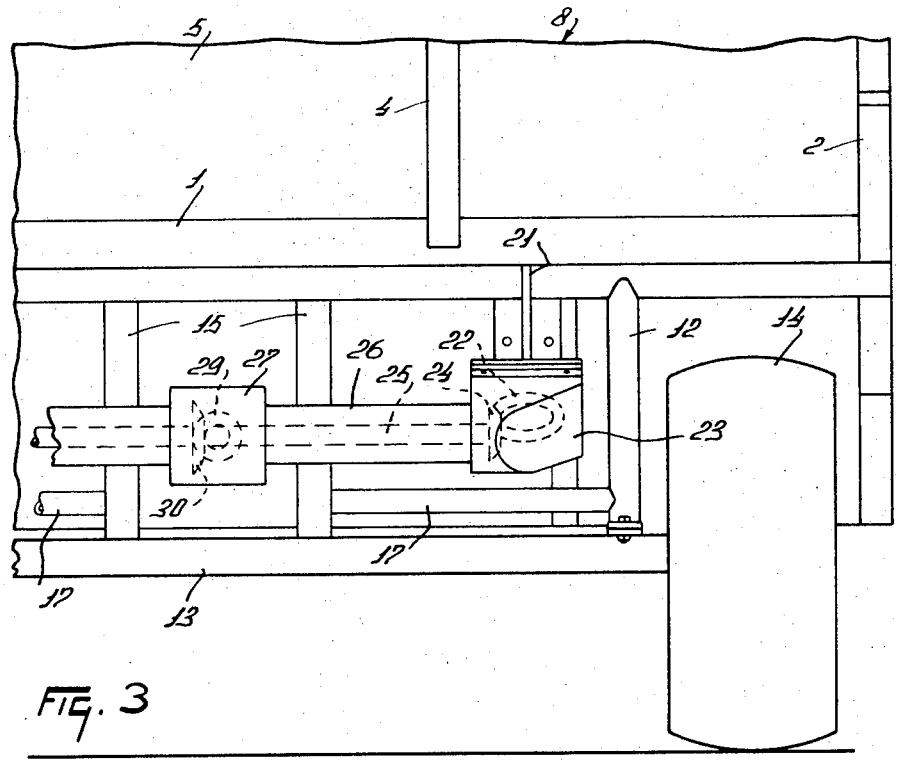
Figure 4:
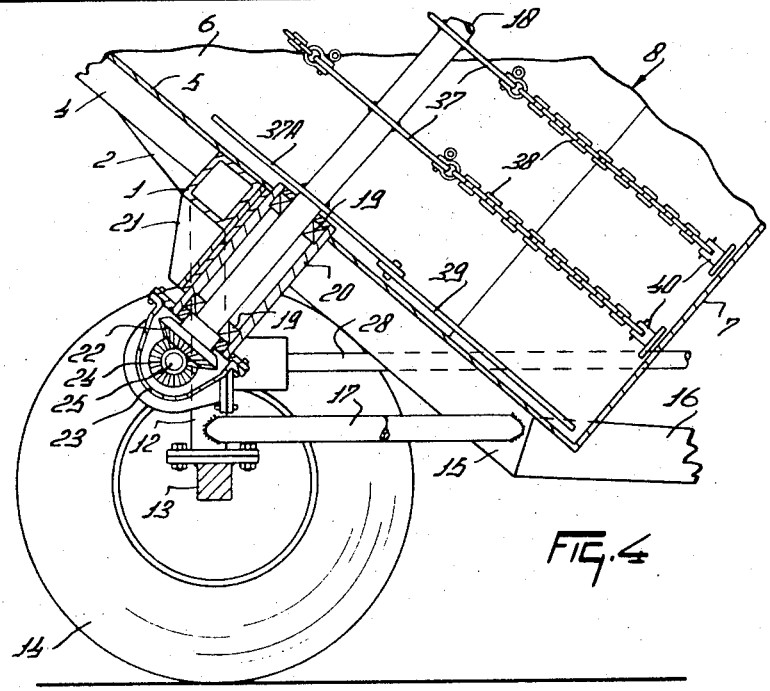
Figure 5:
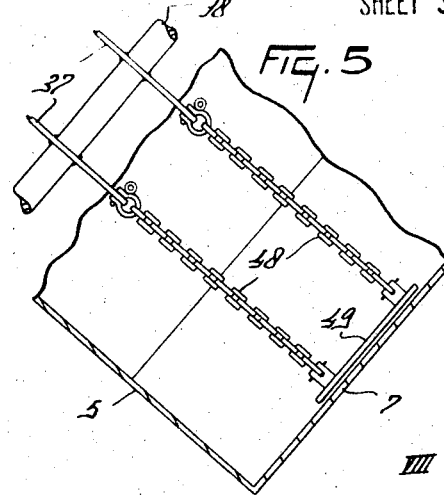
Figure 6:
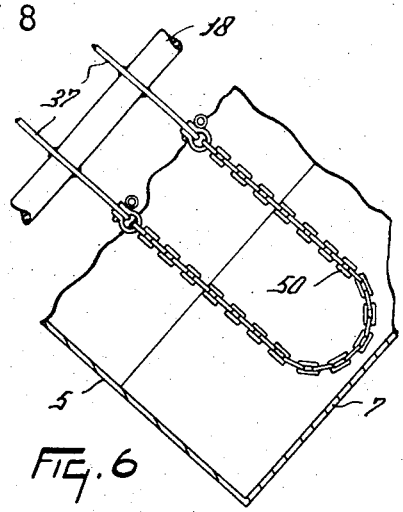
Figure 7:
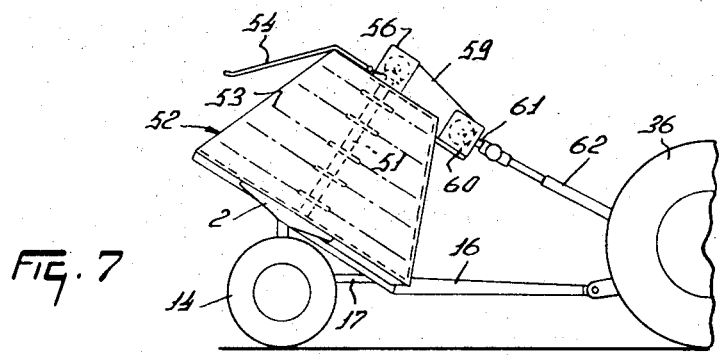
Figure 8:
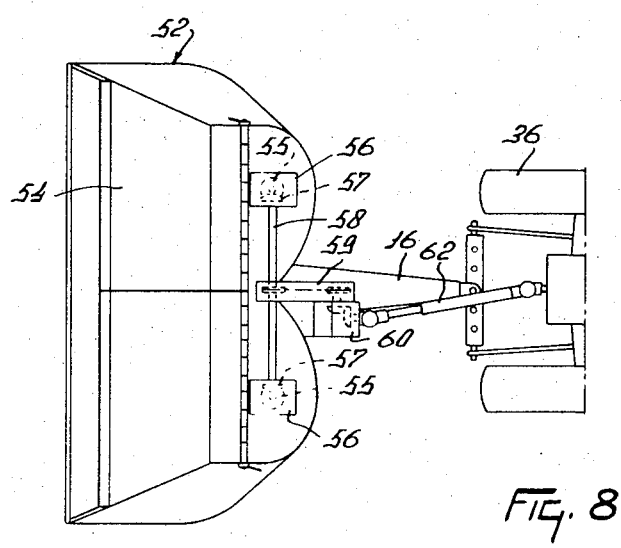
Figure 9:
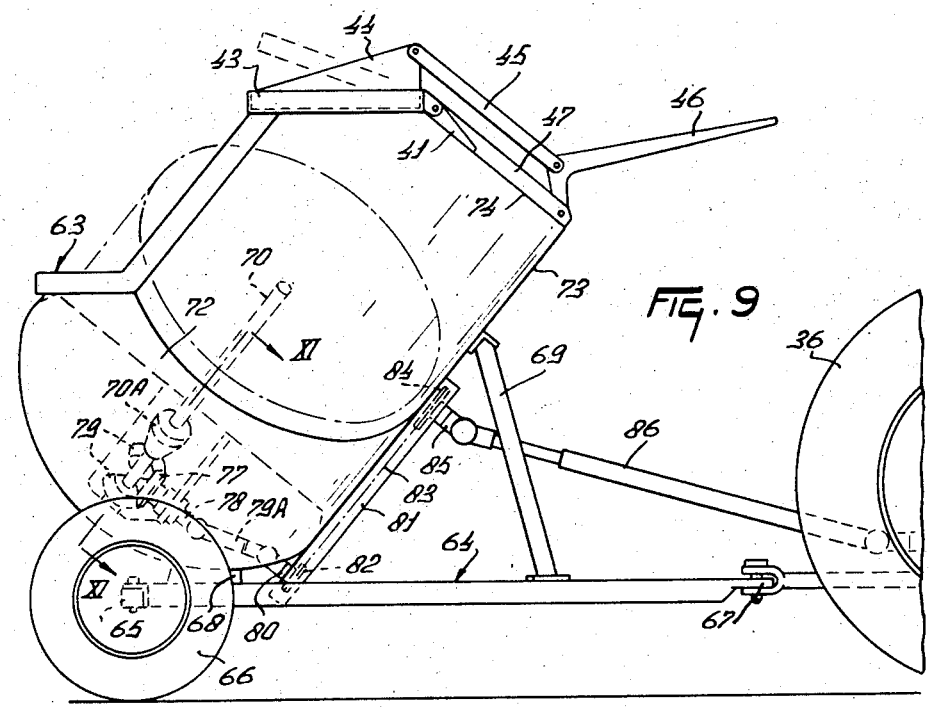
Figure 16:
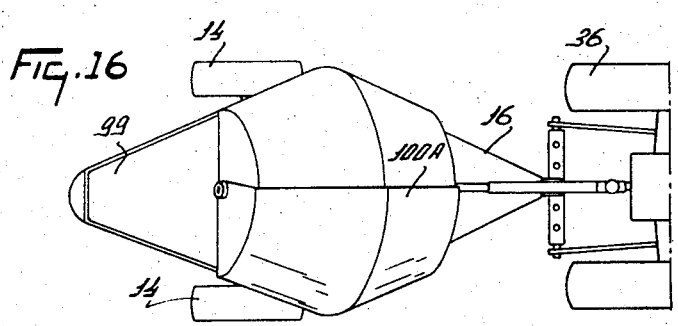
Figure 10:
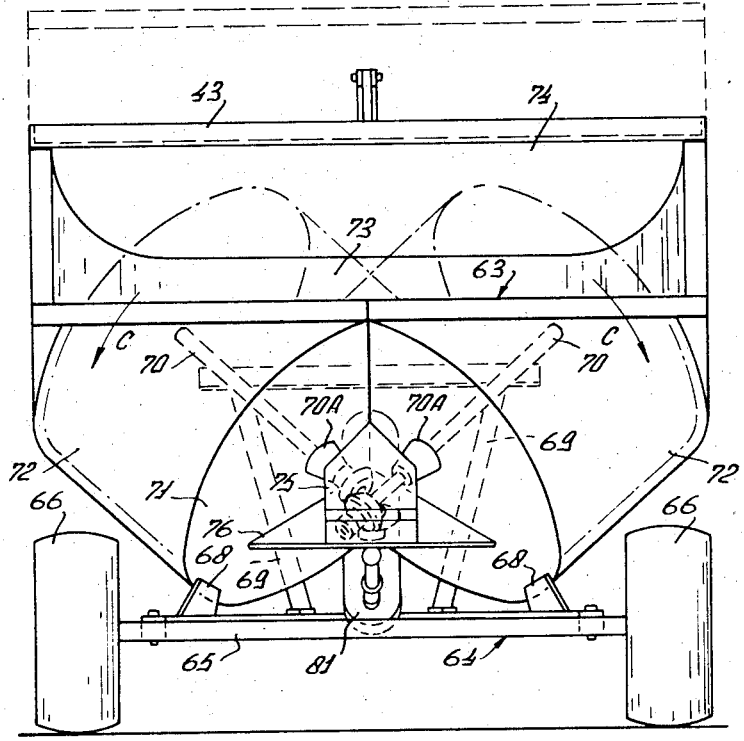
Figure 11:
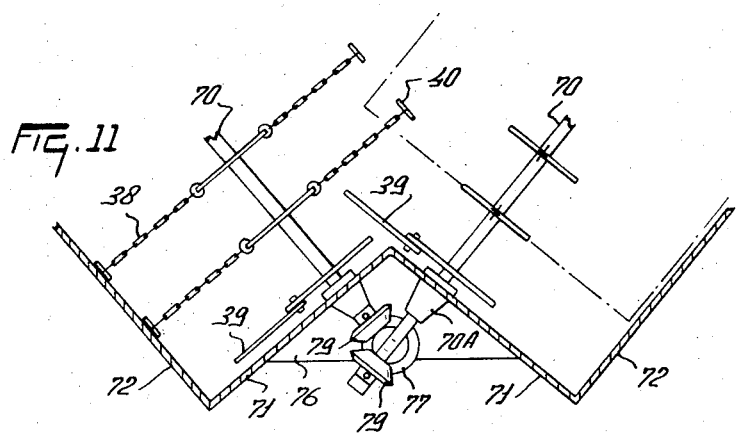
Figure 12:
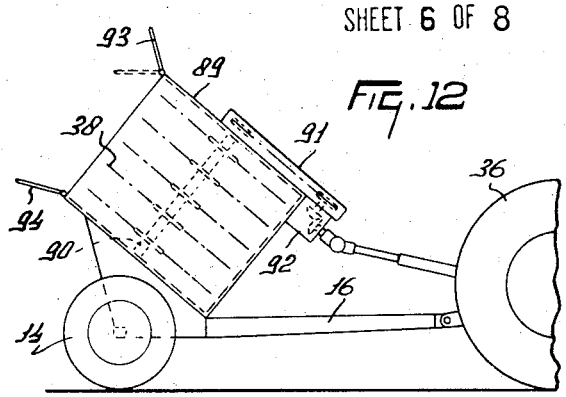
Figure 13:
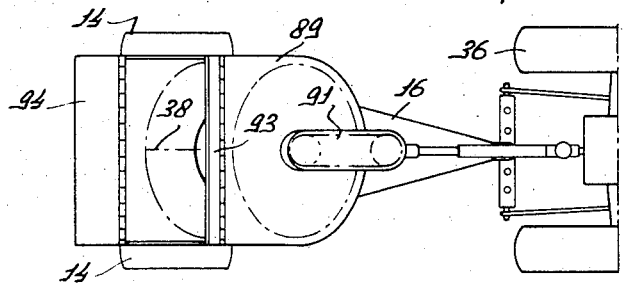
Figure 14:
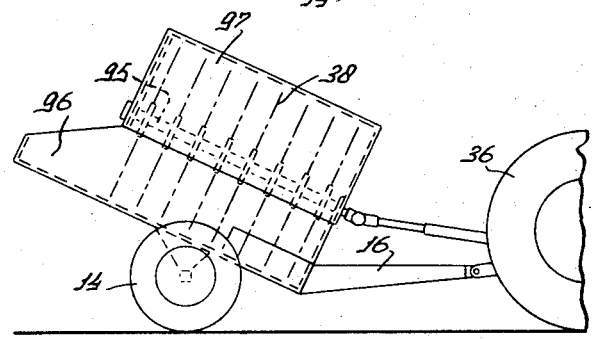
Figure 15:
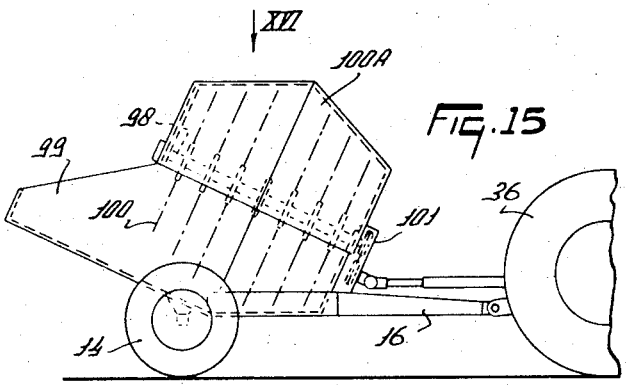
Figure 17:
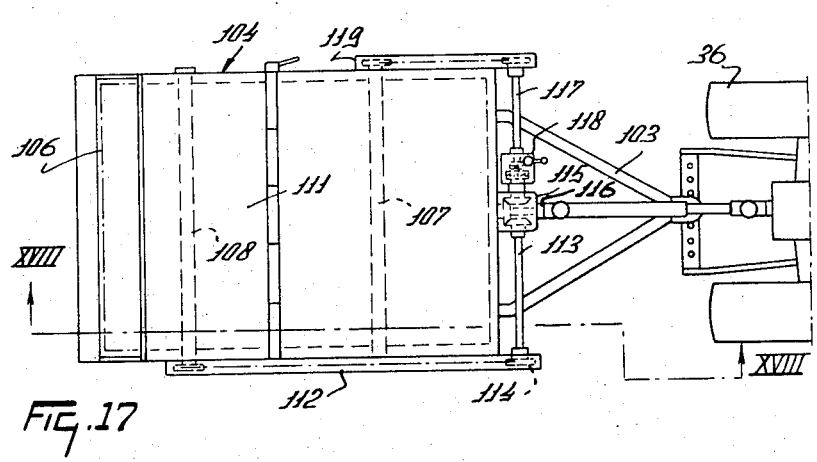
Figure 18:
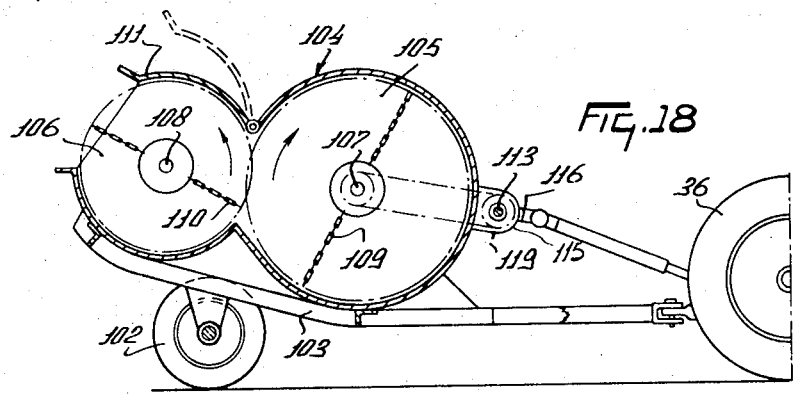
Figure 19:
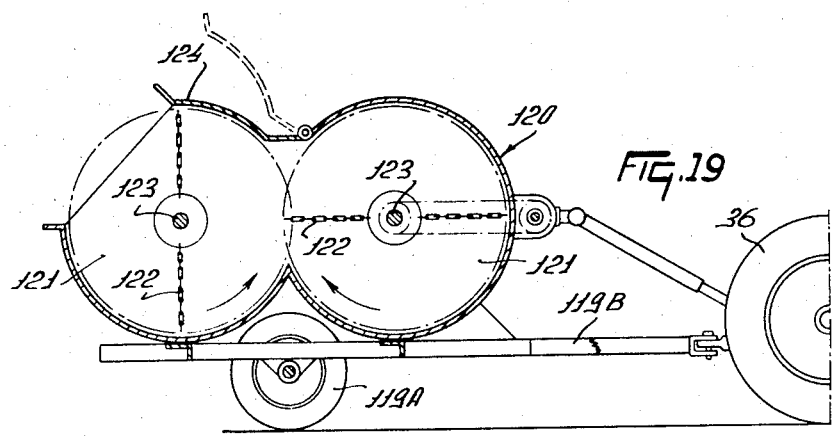
Figure 20:
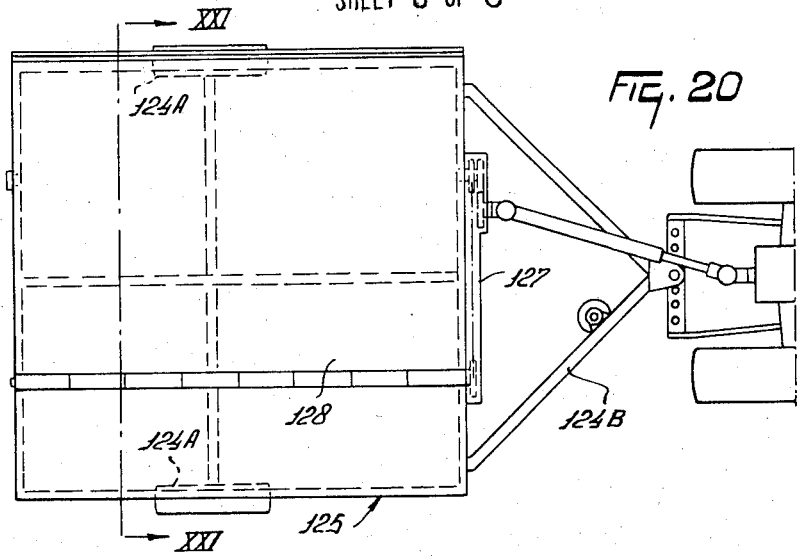
Figure 21:
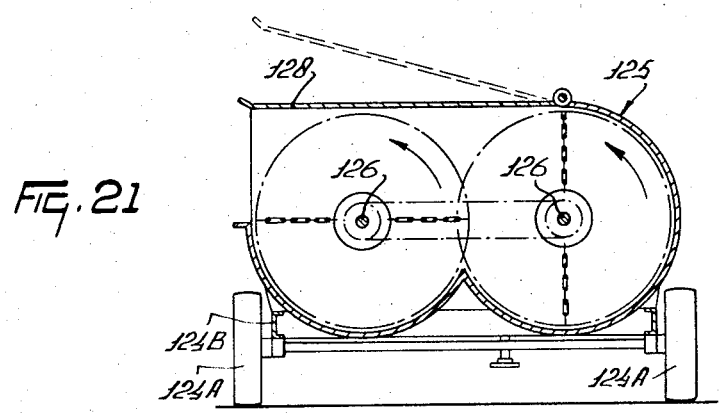
Figure 22:
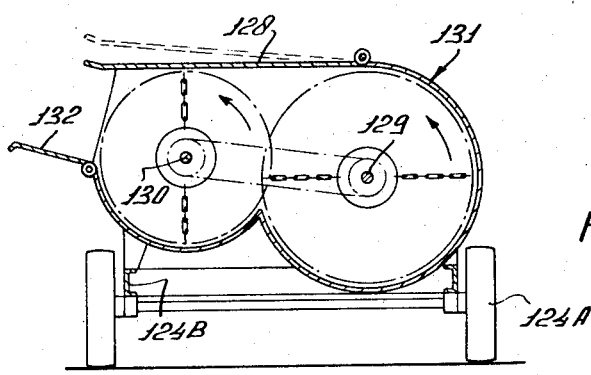

For a better understanding of the invention, and to show how the same may be carried into effect, reference will now be made, by way of example, to the accompanying drawings, in which:

FIG. 1 is a side elevation of a spreading implement in accordance with the invention coupled to the rear of an agricultural tractor, FIG. 2 is a plan view corresponding to FIG. 1, FIG. 3 is a partial rear view, to an enlarged scale, as seen in the direction indicated by an arrow III in FIG. 1, FIG. 4 is a section, to an enlarged scale, taken on the line IV—IV of FIG. 2, FIG. 5 shows an alternative construction of certain parts that can be seen in FIG. 4, FIG. 6 corresponds to FIG. 5 and shows a further alternative construction, FIG. 7 is a side elevation, to a reduced scale, showing an alternative spreading implement in accordance with the invention coupled to the rear of an agricultural tractor, FIG. 8 is a plan view corresponding to FIG. 7, FIG. 9 is a side elevation showing a further alternative spreading implement in accordance with the invention coupled to the rear of an agricultural tractor, FIG. 10 is a rear view of the implement of FIG. 9, FIG. 11 is a section taken on the line XI—XI of FIG. 9, FIG. 12 is a somewhat diagrammatic side elevation, to a reduced scale, showing a further alternative spreading implement in accordance with the invention, coupled to the rear of an agricultural tractor, FIG. 13 is a plan view corresponding to FIG. 12, FIGS. 14 and 15 correspond to FIG. 12 and show further alternative constructions, FIG. 16 is a view as seen in the direction indicated by an arrow XVI in FIG. 15, FIG. 17 is a plan view of a further alternative spreading implement in accordance with the invention coupled to the rear of an agricultural tractor, FIG. 18 is a side view corresponding to FIG. 17 and includes a section taken on the line XVIII—XVIII of FIG. 17, FIG. 19 corresponds to FIG. 18 but shows a further alternative construction, FIG. 20 corresponds to FIG. 17 and shows a further alternative construction, FIG. 21 is a section taken on the line XXI—XXI of FIG. 20, and FIG. 22 corresponds to FIG. 21 but shows a further alternative construction.

Referring to FIGS. 1 to 4 of the drawings, the spreading implement which is illustrated is intended primarily for use in muck spreading operations involving the distribution over the ground surface of farmyard manure, organic vegetable refuse matter and mixed organic and inorganic agricultural materials. The implement has a frame which includes a main beam 1 of rectangular or boxshaped cross-section that extends substantially horizontally perpendicular to the intended direction of operative travel of the implement which is indicated by an arrow A in FIG. 1 of the drawings. The beam 1 could, of course, have angular cross-sections other than the substantially square cross-section which is illustrated. The illustrated beam is arranged in such a way that, in cross-section, a diagonal interconnecting two corners of the beam is substantially horizontally disposed (see FIGS. 1 and 4 of the drawings). The opposite ends of the beam 1 are provided with two perpendicularly projecting and substantially straight supports 2, the supports 2 being so disposed that, as seen in side elevation (FIG. 1), their longitudinal axes make angles with the horizontal of between 30° and 60°, a value of substantially 50° being preferred. Beams 3 are secured to the beam 1 at equal distances from its midpoint so as to extend downwardly from the beam in parallel relationship with the supports 2. Further beams 4 are also secured to the beam 1 at equal distances from the midpoint thereof, said beams 4 being located between the beams 3 so as to extend upwardly and rearwardly, with respect to the direction A, from the beam 1 in parallel relationship with the supports 2 and beams 3. A plate 5 is fastened to the beam 1, the supports 2 and the beams 3 and 4 so as to have its general plane in parallel relationship with those supports and beams. Vertical walls 6 are fastened to the edges of the plate 5 so as to extend parallel to the direction A, the fronts of said walls 6 terminating in cylindrically curved plate portions 7. The cylindrically curved plate portions 7 are joined to one another along a line contained in a vertical plan that extends parallel to the direction A and that also contains the midpoint of the main frame beam 1. The curved plate portions 7 afford the bottom of a hopper 8 which is also bounded by the rear plate 5, the side walls 6 and a top plate 9 that extends parallel to the rear plate 5, said top plate 9 being secured to the upper edges of the curved plate portions 7. The rigidity of the uppermost edges of the side walls 6 is ensured by the provision therealong of beams 10 whose rear-most ends are secured to the opposite ends of a further beam 11 that extends along the uppermost edge of the rear plate 5 in parallel relationship with the hollow frame beam 1. The uppermost and rearmost ends of the laterally spaced apart beams 4 are also secured to the beam 11 at intermediate points along the length of the latter.

Vertical supports 12 are fastened to the main frame beam 1 at locations equally spaced therealong from the midpoint of said beam, the supports 12 being directed downwardly from said beam 1. The lowermost ends of the supports 12 carry a horizontal shaft 13 of square cross-section (FIGS. 3 and 4) which is parallel to the main frame beam 1 and which has two ground wheels 14 rotatably mounted at its opposite ends. Two beams 15 that are equally spaced at opposite sides of the midpoint of the main frame beam 1 project downwardly and forwardly from that beam in parallel relationship with the beams 3, said beams 15 being in contact with the lower surface of the rear plate 5 of the hopper 8. The lowermost leading ends of the beams 15 are disposed just beyond the front edge of the plate 5 and between the two curved plate portions 7. The two limbs of a substantially horizontal draw bar 16 are rigidly secured to them at these points, the rigidity of the whole assembly being increased by two horizontally disposed but forwardly convergent bars 17 that interconnect the lowermost ends of the supports 12 and the leading ends of the beams 15 adjacent the junctions of the latter with the limbs of the draw bar 16.

Two shafts 18 are arranged inside the hopper 8 in laterally spaced apart relationship, each shaft 18 having its longitudinal axis substantially coincident with the center of curvature of a corresponding one of the two cylindrically curved plate portions 7. Each of the forwardly inclined shafts 18 is contained in a vertical plane that is parallel to the direction A and has a lower end region thereof passed through an aperture in the rear plate 5. Each shaft 18 is held in two axially spaced part bearings 19 at the opposite ends of a corresponding sleeve 20 fixed to the main frame beam 1 by a corresponding support 21 (FIGS. 3 and 4). That end of each shaft 18 projects from the bottom of the coresonding sleeve 20 is provided with a bevel pinion 22 located inside a corresponding gear box 23. The teeth of each bevel pinion 22 are in driven mesh, inside the two gear boxes 23, with the teeth of smaller bevel pinions 24 fastened to the opposite ends of a shaft 25 which extends parallel to the main frame beam 1. The shaft 25 is located inside a tubular casing 26 that extends between the two gear boxes 23, said casing 26 including, at substantially its midpoint, a further gear box 27. The shaft 25 is provided, inside the gear box 27, with a bevel pinion 30 whose teeth are in driven mesh with those of a further bevel pinion 29 located at the rearmost end of a rotary shaft 28 which extends forwardly from said gear box 27 substantially horizontally parallel to the direction A. The leading end of the shaft 28 is rotatably journalled in a casing 31 secured to the draw bar 16 and to the curved plate portions 7. A sprocket wheel 32 is fastened to the leading end of the shaft 28 inside the casing 31, said sprocket wheel 32 being in driven communication with an overlying sprocket wheel 34 by way of an endless transmission chain 33. The sprocket wheel 34 is secured to a stub shaft 35 that is located at a higher level than the shaft 28, the leading end of said stub shaft 35 projecting forwardly from the casing 31 and being keyed or splined to enable it to be placed in driven connection with the power take-off shaft of a tractor 36 or other operating vehicle by way of an intermediate telescopic transmission shaft 35A of known construction having universal joints at its opposite ends.

Each of the two shafts 18 is rotatably journalled only at its lowermost and rearmost end and is provided inside the hopper 8, at regular intervals therealong, with five circular plates 37, each disc-like plate 37 being connected centrally to the corresponding shaft 18 in such a way that its plane is perpendicular to the longitudinal axis of that shaft. Flexible ejectors in the form of chains 38 are pivotably connected to each plate 37 in the manner which can be seen in FIG. 4 of the drawings but it will be noted, that, in place of one of the plates 37, a larger plate 37A is positioned at the rearmost end of each shaft 18, with respect to the direction A, each larger plate 37A carrying a single ejector in the form of an arm 39 pivotally connected to the corresponding plate. The ends of the chains 38 that are remote from the plates 37 have heavier blocks 40 pivotally connected to them and it will also be seen that the lengths of the chains 38 are such that the blocks 40 will sweep very closely over the internal surfaces of the curved plate portions 7 that afford the bottom of the hopper 8 when the shafts 18 are rotating at speed and said hopper 8 is substantially empty.

Supports 41 are provided on the top plate 9 of the hopper 8 close to the opposite lateral sides of that plate and a flap or cover 43 which is of rectangular configuration when seen in plan view (FIG. 2) is pivotally connected to the supports 41 by horizontally aligned pins 42. When the flap or cover 43 is in parallel relationship with the top plate 9 of the hopper 8, it bears against edge regions of the side walls 6 and closes a forwardly facing opening at the top of the hopper. A bracket 44 is carried on the upper surface of the flap or cover 43 at the center of the latter and is pivotally connected with a lever 46 by a pair of links 45. The lever 46, which is of angular formation, has its fulcrum afforded by a pivotal connection with a bracket 47 fastened to a central region of the upper surface of the top plate 9 and it will be seen from FIG. 1 of the drawings that the lever 46 can occupy either a position shown in full lines in which the flap or cover 43 is disposed parallel to the top plate 9 of the hopper 8 or a position shown in broken lines in which it is turned forwardly through approximately 90° about the axis afforded by the pivot pins 42. The lever 46 is normally within the reach of the driver of the tractor 36 who can thus move the flap or cover 43 between the two positions shown in full and broken lines in FIG. 1 of the drawings without leaving his driving seat. In conventional implements for spreading manure and the like by means of flexible ejectors, the or each rotary spreading shaft extends parallel to the greatest dimension of the hopper in such a way that, when the hopper is full of material to be spread, both the shaft and the ejectors which it carries are buried beneath the upper surface of that material. The result is that, at the commencement of a spreading operation, a high input of energy is required to turn the or each shaft inside the hopper despite which only a small amount of material is ejected in an irregular manner so that the ground being traversed by such a known implement is not uniformly covered until a later stage in the spreading operation when the or each shaft and its ejectors eventually lower the level of the material in the hopper to an extent which brings them above its upper surface. In a spreading implement in accordance with the invention, the shafts and their ejectors are not completely buried by the farmyard manure or other material to be spread at the beginning of a spreading operation so that reliable distribution of the material can commence from the outset of a spreading operation, the power input that is required at such time being less than is necessary with a conventional implement of one of the kinds discussed above.

In the use of the spreading implement which has been described with reference to FIGS. 1 to 4 of the drawings, its draw bar is connected to the tow bar or hitch point of the tractor 36 or other operating vehicle and the leading end of the stub shaft 35 is placed in driven connection with the power take-off shaft of the same tractor or other vehicle by way of the intermediate telescopic transmission shaft 35A. The hopper 8 is then filled with the manure or other material that is to be spread over the soil through the ejection opening between the beams 10, the flap or cover 43 preferably being tilted upwardly and forwardly into the position thereof that is shown in broken lines in FIG. 1 of the drawings at this time. When the hopper 8 is full, the flap or cover 43 is returned to the position shown in full lines in FIG. 1 of the drawings and the implement is then towed to the field which is to receive the material within its hopper. Upon moving over the field in the direction A with the shafts 18 rotating in the directions indicated by arrows B in FIG. 2 of the drawings, the material is thrown laterally out of the hopper 8 through the opening bounded by the beams 10 and 11 and the rear edge of the flap or cover 43. It will be noted that the paths described by the blocks 40 at the ends of the chains 38 corresponding to the respective shafts 18 overlap one another when the chains 38 reach their maximum radial extent. It will be seen from FIG. 1 of the drawings that the bottom of the hopper 8 (afforded principally by the curved plate portion 7) and also the longitudinal axes of the two shafts 18 are inclined to the horizontal by an angle $\alpha$ which it is preferred should have a magnitude of substantially 50° but which may have a value as great as 60° or as small as 30°. This arrangement ensures that the upper ends of the shafts 18 project above the surface of the manure or other material in the hopper 8 when the hopper is full at the beginning of a spreading operation. The result is that the uppermost chains 38 start to throw material out of the hopper immediately upon rotation of the shafts 18 so that the required amount of material per unit time is spread over a strip of ground of the required width from substantially the commencement of the operation. Since the shafts 18 are not completely covered by the manure or other material, the energy required at the commencement of the operation is not excessive. The hopper 8 can be completely emptied because the ejector shafts 18 extend parallel to the hopper bottom allowing the blocks 40 at the ends of the chains to sweep closely over that bottom as the hopper 8 becomes progressively emptier. The inclined disposition of the plate 5 and curved plate portions 7 will tend to cause the material to gravitate to the lowermost ends thereof and this tendency will, of course, be assisted by the inevitable vibration of the implement that takes place as it travels over the ground with numerous power-driven parts in motion. The top plate 9 and the flap or cover 43, when closed, effectively prevent material in the hopper from being thrown out by jolts, it being noted that said plate 9 and flap or cover 43 (when closed) are disposed substantially perpendicular to the axes of rotation of the two shafts 18. The fact that the shafts 18 are rotatably mounted only at their lowermost and rearmost ends considerably simplifies the construction of the implement with a consequent reduction in its cost.

FIG. 5 of the drawings illustrates a modification in which two neighbouring ejector chains 48 are coupled together at their outermost ends by a single connecting piece 49 that extends substantially parallel to the corresponding shaft 18 when the chains 48 are fully extended with the hopper empty or nearly empty. The arrangement can improve the ejection of the material under some circumstances. FIG. 6 shows a further alternative arrangement in which the ejectors corresponding to two neighbouring plates 37 are formed integrally as a single length of chain 50. This construction enables a tighter mounting of the ejectors to be employed.

FIGS. 7 and 8 of the drawings illustrate an embodiment in which a hopper 52 is substituted for the hopper 8, said hopper 52 being provided with ejector shafts 51 that are arranged in a generally similar manner to the previously described ejector shafts 18. However, in this case, each shaft 51 is rotatably journalled at its upper leading end and is provided with a plurality of chains 53 or other ejectors whose lengths progressively decrease from the bottom of each shaft 51 towards the upper end thereof. The arrangement is such that the uppermost chains 53 or other ejectors have approximately half the fully extended lengths of the lowermost chains 53 or other ejectors. The curved plate portions at the front of the hopper 52 are shaped to match the graduated lengths of the chains 53 or other ejectors and a flap or cover 54 is pivotally connected to the top of the hopper 52 in such a way that it can be tilted forwardly and upwardly for filling purposes.

A gear box 56 is located at the uppermost leading end of each shaft 51 and the two shafts are provided, inside the gear boxes 56, with corresponding bevel pinions 55. The bevel pinions 55 have their teeth in driven mesh with those of bevel pinions 57 carried at the opposite ends of a shaft 58 that extends horizontally perpendicular to the intended direction of operative travel of the implement. A sprocket wheel and chain transmission 59 connects approximately the midpoint of the shaft 58 with the output of a further gear box 60 which contains meshing bevel pinions and from which a rotary input shaft 61 projects downwardly and forwardly with respect to the intended direction of operative travel. The input shaft 61 is splined or keyed and can be placed in driven connection with the power take-off shaft of the tractor 36 or other operating vehicle by way of an intermediate telescopic transmission shaft 62 of known construction having universal joints at its opposite ends. The spreading implement of FIGS. 7 and 8 operates in a generally similar manner to that which has already been described, the paths traced by the tips of the chains 53 or other ejectors corresponding to the two shafts 51 again overlapping one another when said chains 53 or other ejectors are fully extended. Means (not illustrated) may be provided to enable the flap or cover 54 to be retained in different angular settings about its hinge mounting to control the direction of ejection of material from the hopper 52 during a spreading operation.

The spreading implement illustrated in FIGS. 9 to 11 of the drawings has a hopper 63 that is supported from beneath by a frame 64. As seen in plan view, the frame 64 is of generally triangular configuration having a base afforded by a beam 65 that extends substantially horizontally perpendicular to the intended direction of operative travel of the implement, the apex of the triangle exhibiting a coupling ring 67 by which the frame 64 can be pivotally connected to the two bar or hitch point of the tractor or other operating vehicle 36 with the aid of a vertical hitch pin affording the pivot. Ground wheels 66 are rotatably mounted at the opposite ends of the transverse frame beam 65. Rear lower regions of the hopper 63 are rigidly connected to the transverse beam 65 by two brackets 68. Two forwardly and downwardly convergent beams 69 support the hopper 63 at the front, said beams 69 extending between the hopper and corresponding "side" beams of the substantially triangular frame 64. The hopper 63 accommodates two ejector shafts 70 whose longitudinal axes are relatively inclined in such a way that the upper ends of the two shafts 70 are further apart from one another than the lower ends thereof. It is preferred that the angle contained between the longitudinal axes of the two shafts 70 should be about 80° but it may be as small as 60° or as large as 90°. Each shaft 70 has its rear and lower end passed through a corresponding relatively perpendicular wall portion 71 of the hopper 63 that is at the rear of the hopper with respect to the intended direction of operative travel of the implement. The two wall portions 71 make an angular junction that is contained in a vertical plane extending parallel to the intendeded direction of operative travel. Each wall portion 71 is of circular configuration apart from the missing sector thereof whose edge is defined by the junctions between the two portions, the longitudinal axes of the two ejector shafts 70 being coincident with the centers of curvature of the two wall portions 71. Substantially cylindrically curved side walls 72 of the hopper extend upwardly from the curved edges of the underlying wall portions 71, said side walls 72 merging with an inclined hopper bottom 73 which is parallel to an inclined plane extending perpendicular to a vertical plane that is parallel to the intended direction of operative travel. The inclined plane that has just been mentioned preferably makes an angle of not less than 50° with the horizontal and it can be seen from FIG. 9 of the drawings that the longitudinal axes of the two shafts 70 are also parallel to the hopper bottom 73 and to the imaginary inclined plane that has just been mentioned. The uppermost edge of the inclined hopper bottom 73 is connected to a front wall or top 74 of the hopper.

Each shaft 70 is rotatably journalled in a corresponding bearing 70A at the point at which it is entered through a hole in one of the wall portions 71. Immediately beneath the bearings 70A, the lowermost ends of the two shafts 70 are entered into a gear box 75 that is supported by a bracket 76 rigidly secured to the two relatively inclined wall portions 71. A driving shaft 78 (FIG. 9) is rotatably mounted in the front wall of the gear box 75 and its uppermost rear end carries a bevel pinion 77 inside the gear box. The teeth of the bevel pinion 77 are in driving mesh with those of two bevel pinions 79 of equal size that are mounted on the portions of the corresponding shafts 70 that are contained inside the gear box 75. The general arrangement can be seen best in FIG. 11 of the drawings from which it will be evident that the two pinions 79 do not mesh with one another and that the longitudinal axis of the driving shaft 78 actually intersects one of the two shafts 70 but not the other. The arrangement is, in fact, such that the two shafts 70 will be rotated in the relatively opposite directions C that are indicated in FIG. 10 of the drawings. The leading lowermost end of the driving shaft 78 is connected by universal joints and an intervening shaft 79A to a shaft 80 which projects from a chain casing 81. The shaft 80 carries a sprocket wheel 82 inside the chain casing 81 and is in driven communication with a further larger sprocket wheel 84, located at a higher horizontal level, by way of an endless transmission chain 83. The sprocket wheel 84 is mounted on a shaft 85 which projects forwardly and downwardly from the upper end of the casing 81 and it will be seen from the drawings that the projecting keyed or splined end of said shaft 85 can be placed in driven connection with the power take-off shaft of the tractor 36 or other operating vehicle with the aid of an intermediate telescopic transmission shaft 86 of known construction having universal joints at its opposite ends.

Each of the shafts 70 is provided inside the hopper 63 with ejector chains 38 and ejector arms 39 in substantially the same way as has already been described with reference to FIGS. 1 to 4 of the drawings. A pivotally mounted flap or cover 43 is again provided and is movable between a lowered position and a raised position (appropriate to the filling of the hopper) by a lever 46 pivotally connected to the bracket 47 on the front wall or top 74 of the hopper. It will be seen from FIG. 9 of the drawings that the general arrangement of the flap or cover 43 is the same as that which has already been described with reference to FIG. 1, only the dimensions of the various parts being different. During the operation of the implement, the two ejector shafts 70 are rotated in the directions C from the single gear box 75, the provision of the identically dimensioned pinions 79 ensuring that the speeds of rotation of the two shafts 70 are the same. The ejector chains 38 throw the manure or other material laterally out of the hopper 63 and the inclined arrangement of the shafts 70 again ensures that upper portions thereof are free of the surface of the material in the hopper at the beginning of a spreading operation so that the material is spread reliably throughout a strip of land of desired width from substantially the moment of commencement of the operation. Once again, the shafts 70 are rotatably journalled only at their lowermost and rearmost ends but the V-shaped relative disposition of the shafts 70 enables a strip of greater width to be spread reliably with material than in the cases of the foregoing implements. In each of the embodiments that has so far been described, the ejector chains 38, 48, 50 and 53, and the ejector arms 39, may have fully extended lengths of between 50 centimeters and 85 centimeters.

FIGS. 12 and 13 of the drawings illustrate an embodiment in which a hopper 89 is provided with only a single ejector shaft 90. The upwardly and forwardly inclined shaft 90 has its axis substantially coincident with that of the cylindrically curved bottom of the hopper 89 which bottom tangentially meets an imaginary inclined plane that is perpendicular to a vertical plane extending parallel to the intended direction of operative travel of the implement. The imaginary inclined plane makes an angle with the horizontal that is preferably 50° but that may vary between a minimum of substantially 30° and a maximum of substantially 60°. Since the shaft 90 is parallel to the hopper bottom, the longitudinal axis of said shaft is similarly inclined to the horizontal. The shaft 90 is rotated, during the operation of the implement, from its upper end by way of a chain and sprocket wheel transmission 91 contained within a chain casing. The transmission 91 receives drive from the output of an underlying gear box 92 at its leading end, said gear box 92 having a forwardly and downwardly projecting rotary input shaft that can be placed in driven connection with the power take-off shaft of the tractor 36 or other operating vehicle by an intermediate telescopic transmission shaft and universal joints in the known manner which has been mentioned previously. In this embodiment, flaps 93 and 94 are provided along the respective upper and lower edges of the ejection opening of the hopper 89, the two flaps 93 and 94 being individually adjustable about corresponding substantially horizontal hinge axes to influence the direction of ejection of the material from the hopper and to ensure ease of filling of the latter. In this embodiment, the ejector chains 38 may have fully extended lengths of between 85 and 100 centimeters.

FIG. 14 illustrates an embodiment in which an ejector shaft 95 is inclined rearwardly and upwardly from its front to its rear end with respect to the intended direction of operative travel of the implement. With this construction, the hopper 96 that contains the shaft 95 has a hood 97 that is pivotable about a hinge axis extending substantially parallel to the longitudinal axis of the shaft 95 at one lateral side of the hopper. The bottom of the hopper 96 is also substantially parallel to the longitudinal axis of the shaft 95, both these parts being inclined to the horizontal at an angle of substantially 30°. As can be seen in FIG. 14, the hopper 96 extends rearwardly beyond the shaft 95 for some distance so that its capacity is enlarged and the filling thereof is made easier. As the hopper 96 is emptied during a spreading operation, manure or other material initially located at its rear end will automatically slide downwardly and forwardly over the hopper bottom into the reach of the ejector chains 38. The ejector chains 38 are mounted on the shaft 95 in substantially the same way as has already been described and it will be noted that at least the rearmost end of the shaft 95 will be above the upper surface of the manure or other material within the hopper 96 at the commencement of a spreading operation. In this embodiment, the leading end of the shaft 95 projects through a wall of the hopper 96 and is splined or keyed in such a way that it can be placed in direct communication with the power take-off shaft of the tractor 36 or other operating vehicle by way of the known intermediate telescopic transmission shaft and universal joints that have already been mentioned.

FIGS. 15 and 16 of the drawings illustrate an embodiment in which an ejector shaft 98 is arranged in substantially the same manner as the previously described ejector shaft 95. However, in this case, the implement has a hopper 99 whose shape, apart from a rearward extension similar to that of the previously described hopper 96, corresponds to two identical frusto-conical figures that are joined together base-to-base. With this arrangement, it is necessary that the chains 100 or other ejectors should be graduated in length along the shaft 98 so that their fully extended lengths should match the dimensions of the portions of the hopper 99 around which they sweep during the operation of the implement. The longest chains 100 or other ejectors are thus located midway along the shaft 98 with progressive shortenings thereof towards the opposite ends of the shaft. The shaft 98 is again inclined to the horizontal at an angle of substantially 30° and the top of the hopper 99 is provided with a hood 100A that is pivotable about a hinge axis extending substantially parallel to the shaft 98 at one lateral side of the hopper 99. AS in the preceding embodiment, the hook 100A is tilted back for filling the hopper and the material is ejected laterally of the implement from beneath the edge or lip of the hood that is located at the side thereof opposite to its pivotal mounting. As previously mentioned, the hopper 99 has a rearward extension and part of its bottom is inclined to the horizontal at an angle of substantially 30° so that manure or other material will slide downwardly therealong to come within the reach of the chains 100 or other ejectors during the use of the implement. In this case, the leading end of the shaft 98 is provided with a chain and sprocket wheel transmission 101 whose forwardly projecting rotary input shaft is rotated from the power take-off shaft of the tractor 36 or other operating vehicle in the same manner as the preceding embodiments.

FIGS. 17 and 18 of the drawings illustrate a spreading implement in which a frame 103 is supported from the ground by a pair of wheels 102 and carries a hopper 104 that is afforded principally by a pair of interconnected drums 105 and 106. The two drums 105 and 106 are both of generally right circular cylindrical configuration and the longitudinal axis of each of them extends substantially horizontally perpendicular to the intended direction of operative travel of the implement. The leading drum 105 with respect to the direction which has just been mentioned accommodates a shaft 107 that is substantially coincident with its longitudinal axis and the rear drum 106 houses a similarly disposed shaft 108. The two shafts 107 and 108 carry sets of chains 109 and 110 (or other ejectors) respectively, said chains being connected to their respective shafts in a manner similar to that which has been described in respect of the preceding embodiments. It will be seen from FIGS. 17 and 18 of the drawings that the two drums 105 and 106 are of different sizes, these sizes preferably being such that the fully extended chains 109 or other ejectors of the leading drum have lengths of substantially 100 centermeters while the chains 100 or other ejectors of the rear drum 106 have fully extended lengths of substantially 50 centimeters. An upper region of the rearmost drum 106 of the hopper 104 is afforded by a flap 111 which is turnable about a hinge axis extending parallel to the longitudinal axes of the shafts 107 and 108.

The rearmost shaft 108 with respect to the intended direction of operative travel of the implement is driven from one side of the latter through the intermediary of a chain and sprocket wheel transmission contained within a casing 112. The leading end of said transmission comprises a sprocket wheel 114 mounted on a rotary shaft 113 that extends parallel to the longitudinal axes of the shafts 107 and 108. The end of the shaft 113 remote from the sprocket wheel 114 is journalled in a gear box 115 which has a forwardly projecting rotary input shaft 116 arranged to be placed in driven connection with the power take-off shaft of the tractor 36 or other operating vehicle in the manner which has previously been described. The gear box 115 contains meshing bevel pinions and, in addition to the output therefrom which is afforded by the shaft 113, there is a further output in the form of a rotary shaft 117 that is coaxial with the shaft 113, the shaft 117 projecting frm the opposite side of the gear box 115 to the shaft 113. The shaft 117 is provided, alongside the gear box 115, with dog clutch 118 or other optionally engageable coupling having a control that can be set manually to rotate the portion of the shaft 117 that lies therebeyond or to deprive that portion of the shaft of such rotation. The further portion of the shaft 117 that has just been mentioned transmits drive to the shaft 107 by way of a chain and sprocket wheel transmission contained within a casing 119 located at the opposite side of the hopper 104 from the casing 112. In the use of the spreading implement of FIGS. 17 and 18 of the drawings, the manure or other material contained within the rear drum 106 of the hopper 104 is first discharged by rotating the shaft 108 alone, the dog clutch 118 or the like being set to deprive the shaft 107 of rotation. When the drum 106 of the hopper 104 is empty, the dog clutch 118 or other coupling is engaged so that the chains 109 and 110 or other ejectors in both drums 105 and 106 become operative, the manure or other material in the leading drum being transferred to the rear drum by the chains 109 for subsequent ejection by the chains 110. The two shafts 107 and 108 rotate in the directions indicated by arrows in FIG. 18 of the drawings and the paths of travel of the corresponding fully extended chains 109 and 110 or other ejectors just overlap one another when the hopper 104 is completely or nearly empty.

FIG. 19 of the drawings illustrates a spreading implement having a hopper 120 which is again afforded by two drum-like portions 121 whose longitudinal axes both extend substantially horizontally perpendicular to the intended direction of operative travel of the implement. In this embodiment, the two drum-like portions or drums 121 are of substantially the same size and each of them houses a corresponding ejector shaft 123 whose longitudinal axis substantially coincides with that of the drum 121 concerned. The hopper 120 is supported from beneath by a frame 119B having a pair of ground wheels 119A. Each shaft 123 carries a plurality of chains 122 or other ejectors which are mounted in a similar manner to that which has already been described and each of which chains or other ejectors has a fully extended length of substantially 100 centimeters. An upper region of the rear drum 121 is afforded by a flap 124 that can be tilted upwardly, for filling purposes, about a hinge axis extending parallel to the shafts 123, an upwardly tilted position of the flap 124 being shown in broken lines in FIG. 19. The drive transmission to the shafts 123 is similar to that which has been described in connection with the embodiment of FIGS. 17 and 18 of the drawings and is again such that the rearmost drum 121 with respect to the intended direction of operative travel of the implement can first be emptied by rotating its shaft 123 alone. A dog clutch or other optionally engageable coupling is then rendered operative to rotate the ejector shaft 123 of the leading drum 121 also. Manure or other material is then transferred from the leading drum 121 to the rear drum 121 for discharge by the chains 122 or other ejectors of that rear drum.

FIGS. 20 and 21 of the drawings illustrate a spreading implement having a hopper 125 mounted on a frame 124B provided with a pair of ground wheels 124A. The hopper 125 has two parallel ejector shafts 126 that are spaced apart from one another lateraly of the intended direction of operative travel of the implement but which both extend substantially horizontally parallel to that direction. Each ejector shaft 126 is provided with a plurality of chains or other ejectors that are of equal lengths and that are connected to the shafts in the manner which has already been described. It will be seen from FIG. 21 of the drawings that the paths traced by the tips of the chain or other ejectors corresponding to the two different shafts 126 just overlap one another when the chains or other ejectors are fully extended. In this case, the two shafts 126 are driven from a chain and sprocket wheel transmission contained within a casing 127 at the front of the hopper 125 in such a way that both shafts 126 rotate in the same direction that is indicated by an arrow in respect of each of them in FIG. 21. The top of the hopper 125 is provided with a flap 128 which is pivotable about a hinge axis extending substantially horizontally parallel to the intended direction of operative travel of the implement substantially vertically above one of the two shafts 126. Means (not shown) is provided to enable the flap 128 to be placed in different settings about its hinge axis to govern the direction of discharge of the material from the hopper 125.

FIG. 22 of the drawings illustrates a spreading implement which is generally similar to that of FIGS. 20 and 21 except that its hopper 131 comprises two substantially cylindrical portions of different diameters. These two portions house corresponding ejector shafts 129 and 130 that both extend substantially horizontally parallel to the intended direction of operative travel of the implement, said shafts 129 and 130 being provided with corresponding pluralities of chains or other ejectors whose fully extended lengths match the diameters of the portions of the hopper 131 with which they are arranged to c-operate. The shape of the hopper 131 is such that the two portions thereof that have been mentioned are both drum-like in configuration. In addition to the tiltable flap 128 at the top of the hopper 131, the hopper also has a tiltable flap 132 at the lower edge of its lateral discharge opening. This flap 132 can be angularly adjusted about its pivotal mounting to influence the direction of discharge of the material from the hopper.

The spreading implements that have been described have hoppers which can carry relatively large quantites of manure or other material that is to be spread over the ground. The particular arrangements of the ejector shafts are effective in distributing the material reliably and uniformly throughout substantially the whole of a spreading operation without any necessity for a high input of energy. The described implements are, nevertheless, of relatively simple construction so that they can be manufactured quickly and easily and at relatively low cost.

Although certain features of the spreading implements that have been described and/or illustrated in the accompanying drawings will be set forth in the appended claims as inventive features, it is emphasised that the invention is not necessarily limited to those features and that it includes within its scope all of the parts of each spreading implement that has been described and/or illustrated both individually and in various combinations.

What we claim is:

1. A muck spreading implement for attachment to a prime mover comprising a wheeled frame with coupling means at one end thereof and a hopper supported on said frame, said hopper having a bottom and at least one upwardly extending ejector shaft having spaced apart ejectors rotatably mounted within said hopper to eject muck materials over the area being treated, transmission means connected to said shaft to rotate said ejectors through the material in said hopper and eject same from an opening in the hopper to the rear of said coupling means, said shaft extending upwardly to a level adjacent the level of said opening and at least a portion of the bottom of said hopper being inclinded to the horizontal to facilitate the uniform distribution of the material from the hopper during operation.

2. An implement as claimed in claim 1, wherein said ejector shaft is mounted in said hopper to extend at an angle of between 30° and 60° to the horizontal, the upper end of said shaft and a part of said injectors being located to rotate above the level of said material when the hopper is fully loaded.

3. An implement as claimed in claim 1, wherein said ejector shaft is inclined forwardly and upwardly from its rear end to its leading end with respect to the intended direction of operative travel of the implement.

4. An implement as claimed in claim 1, wherein said ejector shaft is inclined downwardly and forwardly from its rear end to its leading end with respect to the intended direction of operative travel of the implement.

5. A muck spreading implement for attachment to a prime mover comprising a wheeled frame with coupling means at one end thereof and a hopper supported on said frame, said hopper having a bottom portion inclined at an angle between the horizontal and vertical and a plurality of upwardly extending ejector shafts rotatably in the hopper mounted to extend substantially parallel to said inclined bottom portion, each of said ejector shafts having spaced apart ejectors connected along their lengths and transmission means connected to said shafts to rotate said ejectros through the muck in said hopper and uniformly eject the muck to the rear of said hopper, through an opening therein, during the implement's movement over the ground.

6. An implement as claimed in claim 5, wherein the two ejector shafts are relatively inclined to one another.

7. An implement as claimed in claim 6, wherein the longitudinal axes of said ejector shafts diverge from one another in an upward direction.

8. An implement as claimed in claim 5, wherein at least one of said ejector shafts has ejectors of different lengths.

9. An implement as claimed in claim 5, wherein said two ejector shafts each have a plurality of ejectors, the lengths of the ejectors on one shaft being different in length from the ejectors on the other shaft.

10. An implement as claimed in claim 5, wherein said two ejector shafts are connected to said transmission means to rotate in opposite directions during operation of the implement.

11. A muck spreading implement for attachment to a prime mover comprising a wheeled frame with coupling means at one end thereof and a hopper supported on said frame, said hopper having an inclined bottom portion and at least one upwardly extending ejector shaft, said hopper having a lower side and said shaft being rotatably mounted in said side to extend substantially parallel to said bottom portion, transmission means connected to said shaft and said shaft having flexible ejectors that pass adjacent said bottom during rotation, said hopper having a back opening through which muck material is thrown by said ejectors during movement over the ground, the upper end of said shaft extending to a level above said opening and the material in said hopper when the latter is fully loaded.

12. An implement as claimed in claim 11, wherein said hopper includes a screening hood which extends over the top of at least part of said hopper and at least a portion of the hood is substantially horizontally disposed.

13. An implement as claimed in claim 11, wherein there are two ejector shafts rotatably mounted in said hopper and said shafts are both driven from a single gear box of said transmission means.

14. An implement as claimed in claim 13, wherein said single gear box includes three toothed pinions arranged respectively on an input shaft and on portions of said two ejector shafts, the pinion on the input shaft being in driving engagement with the other two pinions the latter being disconnected with one another and being of identical size.

15. An implement as claimed in claim 11, wherein there are two ejector shafts and said hopper has two wall portions which are concentrically curved around each respective shaft, said hopper having a transitional portion between two said curved wall portions.

16. A muck spreading implement for attachment to a prime mover, comprising a wheeled frame supporting a plural sided hopper, said frame including lower beam means which extend along and support a first side of said hopper, at least one ejector shaft with flexible and spaced apart ejectors rotatably mounted in said first side and transmission means being in driving connection with said shaft, said beam means and hopper being tilted whereby the bottom thereof and said shaft extend upwardly at an angle of about 30 to 60 degrees between the vertical and horizontal, the rear side of said hopper being open to allow the ejection of muck material from said hopper when said ejectors are rotated, the upper end of said shaft being free, whereby said end and at least a part of said ejectors extend to a line above the open rear side of said hopper, said hopper having a top cover with operating means to raise the cover from said hopper.

* * * * *